United States Patent
Joshi et al.

(10) Patent No.: US 9,431,681 B2
(45) Date of Patent: Aug. 30, 2016

(54) HIGH TEMPERATURE SODIUM BATTERY WITH HIGH ENERGY EFFICIENCY

(71) Applicant: CERAMATEC, INC., Salt Lake City, UT (US)

(72) Inventors: Ashok V. Joshi, Salt Lake City, UT (US); Sai Bhavaraju, West Jordan, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 186 days.

(21) Appl. No.: 14/478,676

(22) Filed: Sep. 5, 2014

(65) Prior Publication Data

US 2015/0061570 A1 Mar. 5, 2015

Related U.S. Application Data

(60) Provisional application No. 61/874,114, filed on Sep. 5, 2013.

(51) Int. Cl.
*H02J 7/00* (2006.01)
*H01M 10/39* (2006.01)
*H01M 10/46* (2006.01)

(52) U.S. Cl.
CPC ..... *H01M 10/3909* (2013.01); *H01M 10/3918* (2013.01); *H01M 10/465* (2013.01); *H01M 2300/0028* (2013.01); *H01M 2300/0045* (2013.01); *H01M 2300/0054* (2013.01)

(58) Field of Classification Search
CPC .............................................. H01M 10/3909
USPC ........................................................ 320/101
See application file for complete search history.

(56) References Cited

U.S. PATENT DOCUMENTS

| | | |
|---|---|---|
| 3,847,667 A | 11/1974 | Werth |
| 4,335,191 A | 6/1982 | Peled |

(Continued)

FOREIGN PATENT DOCUMENTS

| | | |
|---|---|---|
| EP | 2490293 | 8/2012 |
| JP | 08321322 | 12/1996 |

(Continued)

OTHER PUBLICATIONS

Eoff, Anca "Non-Final Office Action", U.S. Appl. No. 14/298,302, (Nov. 18, 2015),1-19.

(Continued)

*Primary Examiner* — Richard V Muralidar
(74) *Attorney, Agent, or Firm* — Paul S. Cha

(57) ABSTRACT

A molten sodium secondary cell charges at a high temperature and discharges at a relatively lower temperature. The cell includes a sodium anode and a cathode. A sodium ion conductive solid membrane separates the cathode from the sodium anode and selectively transports sodium ions. A solar energy source includes a photovoltaic system to provide an electric charging potential to the sodium anode and the cathode and a solar thermal concentrator to provide heat to the cathode and catholyte composition to cause the molten sodium secondary cell to charge at a temperature in the range from about 300 to 800° C. The cell has a charge temperature and a charge voltage and a discharge temperature and a discharge voltage. The charge temperature is substantially higher than the discharge temperature, and the charge voltage is lower than the discharge voltage.

27 Claims, 5 Drawing Sheets

(56) References Cited

U.S. PATENT DOCUMENTS

| | | | |
|---|---|---|---|
| 4,894,298 | A | 1/1990 | Vukson et al. |
| 5,019,466 | A | 5/1991 | Coetzer et al. |
| 5,053,294 | A | 10/1991 | Sernka et al. |
| 6,007,943 | A | 12/1999 | Coetzer |
| 6,187,479 | B1 | 2/2001 | Liu |
| 2005/0260460 | A1 | 11/2005 | Kishi et al. |
| 2006/0141346 | A1 | 6/2006 | Gordon et al. |
| 2008/0268327 | A1 | 10/2008 | Gordon et al. |
| 2009/0134842 | A1 | 5/2009 | Joshi et al. |
| 2010/0279174 | A1 | 11/2010 | Young |
| 2010/0297537 | A1 | 11/2010 | Coors et al. |
| 2011/0019904 | A1 | 1/2011 | Andersson et al. |
| 2011/0104526 | A1 | 5/2011 | Boxley et al. |
| 2011/0223460 | A1 | 9/2011 | Farmer |
| 2012/0021273 | A1 | 1/2012 | Ohmori et al. |
| 2012/0219833 | A1 | 8/2012 | Coors et al. |
| 2014/0210422 | A1 | 7/2014 | Bhavaraju et al. |
| 2014/0212707 | A1 | 7/2014 | Bhavaraju et al. |
| 2015/0365042 | A1* | 12/2015 | Sameshima ......... H01L 31/0549 320/101 |
| 2016/0043591 | A1* | 2/2016 | Oakley, Jr. ............. H02J 7/355 320/101 |

FOREIGN PATENT DOCUMENTS

| | | |
|---|---|---|
| JP | 2004178991 | 6/2004 |
| JP | 2009009933 | 1/2009 |
| KR | 20100027321 | 3/2010 |
| KR | 20130098236 | 9/2013 |
| WO | WO2010110465 | 9/2010 |
| WO | WO2010135283 | 11/2010 |
| WO | WO 2012/114951 | 8/2012 |
| WO | WO2012117916 | 9/2012 |
| WO | WO2012132813 | 10/2012 |

OTHER PUBLICATIONS

Barcena, Carlos "Non Final Office Action", U.S. Appl. No. 14/292,130, (Dec. 8, 2015),1-9.

Cho, Ki Y., "International Search Report", PCT application US2011/059624. (Corresponding to U.S. Appl. No. 13/290,716), (May 22, 2012),1-3.

Cho, Ki Y., "Written Opinion of the International Searching Authority", PCT application US2011/059624 (Corresponding to U.S. Appl. No. 13/290716), (May 22, 2012),1-3.

Totsuka, Kazuhide "Patent Abstracts of Japan (JP 08-321322)", English Language Abstract of Japanese patent publication JP JP 08-321322, (Dec. 3, 1996),1.

Bito, et al., "Bibliographical Data and Abstract of JP2004178991", Japanese Published Patent Application JP 2004178991, (Jun. 24, 2004),1.

Wang, et al., "Room temperature Na/S batteries with sulfur composite Cathode Material", Electrochemistry Communications 9 (2007), Elsevier, (Jun. 18, 2006),31-34.

Shin, Ju C., "International Search Report", PCT Application No. PCT/US14/41329 (Corresponding to U.S. Appl. No. 14/298,302;), (Oct. 2, 2014),1-3.

Shin, Ju C., "Written Opinion of the International Searching Authority", PCT Application No. PCT/US14/41329 (Corresponding to U.S. Appl. No. 14/298,302;), (Oct. 2, 2014),1-6.

Kim, et al., "The Role of Additives in the Electroreduction of Sodium Ions in Chloroaluminate-Based Ionic Liquids", Journal of the Electrochemical Society, 2005, vol. 152, No. 1 pp. E9-E13, (Dec. 1, 2004),E9-E13.

Lang, et al., "Catalytic additives for the reversible reduction of sodium in chloroaluminate ionic liquids", Electrochimica Acta, 2006, vol. 51, Iss. 19, pp. 3884-3889, (Dec. 27, 2005),3884-3889.

Choi, Sang W., "International Search Report", PCT Application No. PCT/US2014/0423698 (Corresponding to U.S. Appl. No. 14/205,019, (Jul. 29, 2014),1-3.

Choi, Sang W., "Written Opinion of the International Searching Authority", PCT Application No. PCT/US2014/0423698 (Corresponding to U.S. Appl. No. 14/205,019, (Jul. 29, 2014),1-6.

Shin, Ju C., "International Search Report", PCT Application No. PCT/US2014/40297 (Corresponding to U.S. Appl. No. 14/292,130, (Sep. 25, 2014),1-3.

Shin, Ju C., "Written Opinion of the International Searching Authority", PCT Application No. PCT/US2014/40297 (Corresponding to U.S. Appl. No. 14/292,130;), (Sep. 25, 2014),1-6.

Shozo, Fujiwara "English Language Abstract", JP2009009933, (Jan. 15, 2009),1.

Cho, Han S., "International Search Report", PCT Application No. PCT/US14/57462 (Corresponding to U.S. Appl. No. 14/496,509), (Jan. 9, 2015),1-3.

Cho, Han S., "Written Opinion of the International Searching Authority", PCT Application No. PCT/US14/57462 (Corresponding to U.S. Appl. No. 14/496,509), (Jan. 9, 2015),1-4.

Shin, Ju C., "International Search Report", PCT Application No. PCT/US2014/024066 (Corresponding to U.S. Appl. No. 14/205,772, (Jun. 27, 2014),1-3.

Shin, Ju C., "Written Opinion of the International Searching Authority", PCT Application No. PCT/US2014/024066 (Corresponding to U.S. Appl. No. 14/205,772, (Jun. 27, 2014),1-6.

Li, et al., "Rechargeable Ni-Li Battery Integrated Aqueous/Non Aqueous System", Enemy Technology Research Institute, National Institute of Advanced Industrial Science and Technology, (Oct. 5, 2009),15098-15099.

Carrico, Robert S., "Notice of Allowance", U.S. Appl. No. 13/290,716, (Oct. 29, 2014),1-8.

Hueso, et al., "High Temperature Sodium Batteries: Status, challenges and future trends", Energy & Environmental Science, 2013, 6, 734-749, (Jan. 14, 2013),734-749.

Sudworth, J.L. "The sodium/nickel chloride (ZEBRA) battery", Journal of Power Sources 100 (2001) 149-163, (Jan. 1, 2001),149-163.

Carrico, Robert S., "Non-Final Office Action", U.S. Appl. No. 13/290,716, (Jul. 22, 2014),1-19.

Shin, Ju C., "International Search Report", PCT Application No. PCT/US2014/054339 (Corresponding to U.S. Appl. No. 14/478,676), (Dec. 15, 2014),1-3.

Shin, Ju C., "Written Opinion of the International Searching Authority", PCT Application No. PCT/US2014/054339 (Corresponding to U.S. Appl. No. 14/478,676), (Dec. 15, 2014),1-3.

Yuki, Saori "Japanese Office Action", Japanese App No. JP2013-537914, (Sep. 8, 2015),1-8.

Motohiro, Fukuhara "English Language Abstract", KR20100027321, (Mar. 11, 2010),1.

Soo, et al., "English Language Abstract", KR20130098236, (Sep. 4, 2013),1.

* cited by examiner

HIGH TEMPERATURE SODIUM BATTERY WITH HIGH ENERGY EFFICIENCY

CROSS-REFERENCE TO RELATED APPLICATION

This application claims the benefit of U.S. Provisional Patent Application No. 61/874,114, filed Sep. 5, 2013, entitled HIGH TEMPERATURE SODIUM-SULFUR BATTERY WITH HIGH ENERGY EFFICIENCY. The foregoing application is incorporated by reference.

FIELD OF THE INVENTION

The disclosed invention relates to a molten sodium battery that is charged at a high temperature and discharged at a low temperature, relative to the charge temperature. The battery is particularly suited for storing solar energy. It utilizes solar energy in the form of both heat and photovoltaic electric potential. The heat facilitates high temperature charging, and the photovoltaic electric potential drives the electrochemical reactions necessary for charging the battery.

BACKGROUND OF THE INVENTION

There is an increasing need to utilize solar energy to power the electric grid because of its clean, non-polluting nature and wide availability. Two of the methods of utilization of solar energy are photovoltaic systems that generate electricity and solar thermal concentrators that generate heat. The heat may then be directly used, may be used to generate steam that can operate a turbine, may be used to store energy in a reversible phase change, or may be used to drive a process that could store a substance chemically that could later be used. An efficient and low-cost energy storage system is desirable for storing the renewable solar energy to further increase widespread solar energy usage for electric grid applications.

BRIEF SUMMARY OF THE INVENTION

The presently disclosed invention relates to a unique electrochemical energy storage (e.g. battery or fuel cell) system that utilizes the electricity and heat provided by a combined solar heat and photovoltaic electricity generator. During the battery operation, the battery charges and discharges at different temperatures. The battery is heated by a source of thermal energy. In a disclosed embodiment, the source of heat is a solar thermal concentrator. In another disclosed embodiment, the source of heat is geothermal energy. During discharge, electrons are given up at the anode in electronic communication via a circuit connected the cathode where the electrons are captured by the cations to form the discharged product. The cathode is in ionic communication with the catholyte bath. A cationically conductive membrane separates the electrolyte from the anode such that as cations pass through and are reduced at the cathode they are stored near that electrode until the device is ready to be charged. During charge, the process reverses itself, where the electrons are given up at the cathode and are captured by the cations transported back through the cation conductive membrane to form the charged product at the anode and are stored near that electrode until the device is ready to be discharged.

In the presently disclosed invention, the charge process happens advantageously at a higher temperature than the discharge process. Also, the battery utilizes the electrons provided by the solar photovoltaic system for charging while being heated using solar heat concentrator.

The disclosed system may be in the form of a molten sodium battery or secondary cell that charges at a high temperature and discharges at a relatively lower temperature.

The disclosed molten sodium battery or secondary cell includes a sodium anode that undergoes electrochemical oxidation during discharge and electrochemical reduction during charge. The molten sodium battery further includes a cathode that undergoes electrochemical reduction during discharge and electrochemical oxidation during charge. The cathode comprises a catholyte composition that is thermally stable at cell operating conditions. The battery has a sodium ion conductive solid membrane separating the cathode and catholyte composition from the sodium anode that selectively transports sodium ions and is chemically and thermally stable at cell operating conditions. The battery includes a solar energy source. The solar energy source may include both a photovoltaic system to provide an electric charging potential to the sodium anode and the cathode and a solar thermal concentrator to provide heat to the battery and more specifically to the cathode and catholyte composition. Importantly, the cell has a charge temperature and a charge voltage and a discharge temperature and a discharge voltage, wherein the charge temperature is substantially higher than the discharge temperature and the charge voltage is lower than the discharge voltage. This is possible because the electrochemical reaction products formed during cell charge have a free energy of formation that is lower at the charge temperature than the discharge temperature.

In some non-limiting embodiments, the solar heat may be used to cause the molten sodium secondary cell to charge at a temperature in the range from about 300 to 800° C. In some non-limiting embodiments, the cell has a discharge temperature in the range from about 110 to 350° C.

In one non-limiting embodiment, the cathode is sulfur and the catholyte composition comprises one or more sodium sulfide compounds.

In another non-limiting embodiment, the cathode is a halogen and the catholyte composition comprises a sodium halide and a solvent. The solvent is selected from an organic solvent, an ionic liquid, and an inorganic molten-salt.

Non-limiting examples of the organic solvent include methylacetamide, dimethylacetamide, N-methyl formamide (NMF), formamide, dimethylformamide, tetraglyme, diglyme, dimethylether N-methyl formamide, dimethyl sulfoxide, and methyl sulfonyl chloride.

Non-limiting examples of the ionic liquid include quaternary-ammonium, phosphonium, imidazolium, or pyrrolidinium cations with halogenoaluminate, tetrafluroborate, halide, or bis(trifluoromethylsulfonyl)amide anions.

Non-limiting examples of the inorganic molten-salt include $NaM_x(X1)_y(X2)_z$, where X1 and X2 are halogens selected from Cl, Br or I; M can be Al, Cu, In, Ga or any trivalent metal cation; x is greater than or equal to 1 and less than or equal to 2; y is greater than or equal to zero and less than or equal to seven; and z is greater than or equal to zero and less than or equal to seven. The sodium metal halogen compounds, of which sodium haloaluminate compounds are representative examples, can be neutral, acidic or basic.

In one non-limiting embodiment, the sodium ion conductive solid membrane comprises a sodium β"-alumina ceramic electrolyte. Because the sodium β"-alumina ceramic electrolyte is chemically and thermally stable at very high temperature, it may operate at a cell charge temperature from about 500 to 800° C. The cell may operate at a cell discharge temperature in the range from about 280 to 350° C.

In another non-limiting embodiment, the sodium ion conductive solid membrane comprises a NaSICON ceramic electrolyte. Because the NaSICON ceramic electrolyte provide high sodium conductivity at lower temperatures, compared to sodium β"-alumina, it may operate at a cell discharge temperature in the range from about 110 to 200° C. and a cell charge temperature in the range from about 300 to 400° C.

The disclosed invention includes a method of operating a molten sodium battery or secondary cell. The method utilizes a hybrid sodium anode battery disclosed herein. The battery includes a sodium anode that undergoes electrochemical oxidation during discharge and electrochemical reduction during charge. The battery further includes a cathode that undergoes electrochemical reduction during discharge and electrochemical oxidation during charge. The cathode includes catholyte composition that is thermally stable at cell operating conditions.

The battery has a sodium ion conductive solid membrane separating the cathode and catholyte composition from the sodium anode that selectively transports sodium ions and is chemically and thermally stable at cell operating conditions. The battery includes a solar energy source. The solar energy source may include both a photovoltaic system to provide an electric charging potential to the sodium anode and the cathode and a solar thermal concentrator to provide heat to the battery and more specifically to the cathode and catholyte composition.

The secondary cell has a charge temperature and a charge voltage and a discharge temperature and a discharge voltage. In operation, the secondary cell is charged at a charge temperature that is substantially higher than the discharge temperature, and the charge voltage is lower than the discharge voltage. This is possible because the electrochemical reaction products formed during cell charge have a free energy of formation that is lower at the charge temperature than the discharge temperature.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1A:
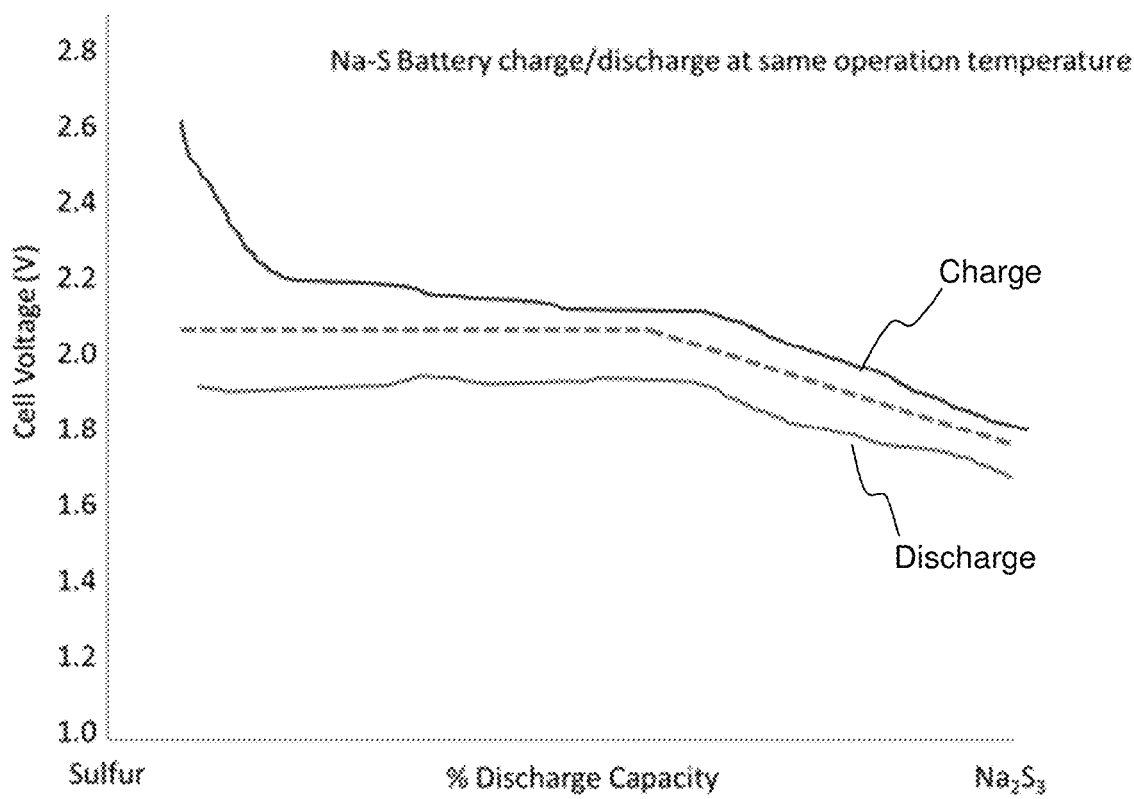
FIG. 1A illustrates the theoretical charge/discharge profile of a Na—S battery under normal operation. It is a graph of theoretical cell voltage as a function of sulfur content, and temperature, for a sodium-sulfur electrochemical cell.

The present embodiments will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the methods and cells of the present invention, as represented in the figures, is not intended to limit the scope of the invention, as claimed, but is merely representative of present embodiments of the invention.

The disclosed invention is drawn to a molten sodium battery or secondary cell. The battery includes a sodium anode that undergoes electrochemical oxidation during discharge and electrochemical reduction during charge. The molten sodium battery further includes a cathode that undergoes electrochemical reduction during discharge and electrochemical oxidation during charge. The cathode comprises a catholyte composition that is thermally stable at cell operating conditions. The battery has a sodium ion conductive solid membrane separating the cathode and catholyte composition from the sodium anode that selectively transports sodium ions and is chemically and thermally stable at cell operating conditions.

The battery includes a solar energy source. The solar energy source may include both a photovoltaic system to provide an electric charging potential to the sodium anode and the cathode and a solar thermal concentrator to provide heat to the battery and more specifically to the cathode and catholyte composition. Importantly, the cell has a charge temperature and a charge voltage and a discharge temperature and a discharge voltage, wherein the charge temperature is substantially higher than the discharge temperature and the charge voltage is lower than the discharge voltage. This is possible because the electrochemical reaction products formed during cell charge have a free energy of formation that is lower at the charge temperature than the discharge temperature.

In one disclosed embodiment, the sodium secondary cell is in the form of a sodium-sulfur battery (Na—S) combined with a photovoltaic/solar concentrator. This battery typically operates at temperatures greater than 300° C. where the sodium anode and sulfur/sodium polysulfides are in molten state. Sodium-sulfur batteries offer great potential to meet many of the above-stated needs. The theoretical specific energy of sodium-sulfur batteries is 792 Wh/kg, assuming the following overall discharge reaction:

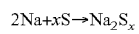

In some cases, high polysulfides ($Na_2S_y$) or a combination of sulfur and high polysulfides are reduced to form lower polysulfides ($Na_2S_x$), where y>x.

The theoretical specific energy is one of the highest known specific energies for batteries that use non-gaseous constituents. The materials needed to produce these batteries are light, energetic, inexpensive, and readily available. In contrast with most cathode materials, sulfur is relatively non-toxic, making these batteries relatively safe for human contact.

The sodium-sulfur battery has an open circuit voltage (OCV) of ~1.8 to 2 V with the charge happening at above 0.1 to 0.2 V above OCV and discharge happening at 0.1 to 0.2 V below OCV at practical current densities. During discharge, sodium is oxidized to sodium ions and electrons are transported to the cathode via a sodium ion conductive solid membrane. Two non-limiting examples of sodium ion conductive solid membrane include sodium β"-alumina and NaSICON.

The elemental sulfur (or higher sodium polysulfides, $Na_2S_y$) present at the cathode are reduced by capturing the electrons to form the lower sodium polysulfides, $Na_2S_x$, where y>x. During charge, the process reverses (electrons and sodium ions are transported back to the anode). The sodium metal and sulfur (or high sodium polysulfides) are regenerated.

Figure 1B:
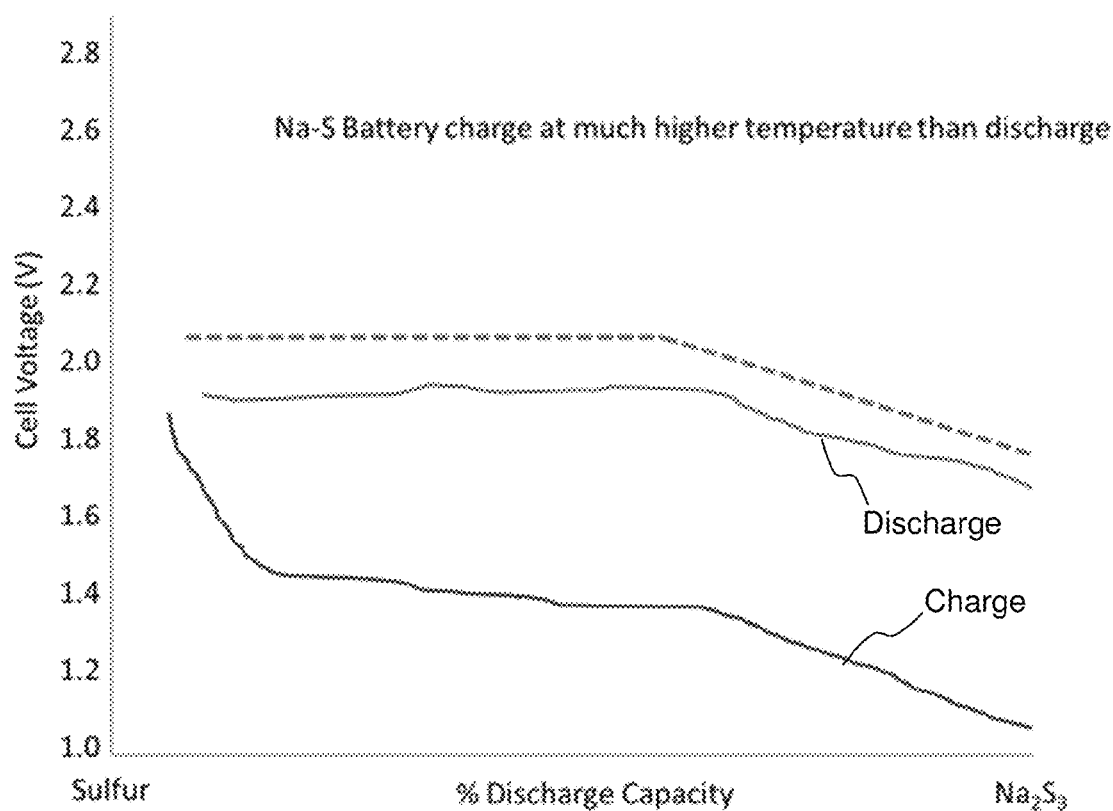
FIG. 1B illustrates the theoretical charge/discharge profile of a battery when charged at a higher temperature according to the disclosed invention. It is a graph of cell voltage as a function of sulfur content, and temperature, for a sodium-sulfur electrochemical cell.

According to the presently disclosed invention, the battery is discharged at lower temperature, between about 280 and 350° C., but is charged at a much higher temperature than typical (e.g. 500 to 800° C.). It is known that if the sodium-sulfur battery charges at such a higher temperature it occurs at a lower voltage than typical. This lowering of charge voltage is due to lowering of free energy required to form the electrochemical charge reaction products (e.g., Na and S or high polysulfides) at higher temperature. FIGS. 1A and 1B illustrate the possible (theoretical) charge/discharge profile of a sodium-sulfur battery under normal operation (FIG. 1A) where the charge and discharge temperatures are substantially the same and when charged at a higher temperature (FIG. 1B) and discharged at a lower temperature according to the disclosed invention.

This molten sodium battery as disclosed herein is envisioned to be charged during day time when the solar heat and electricity are available and discharged during the off-peak hours of solar energy (heat and electricity) generation.

Figure 2A:
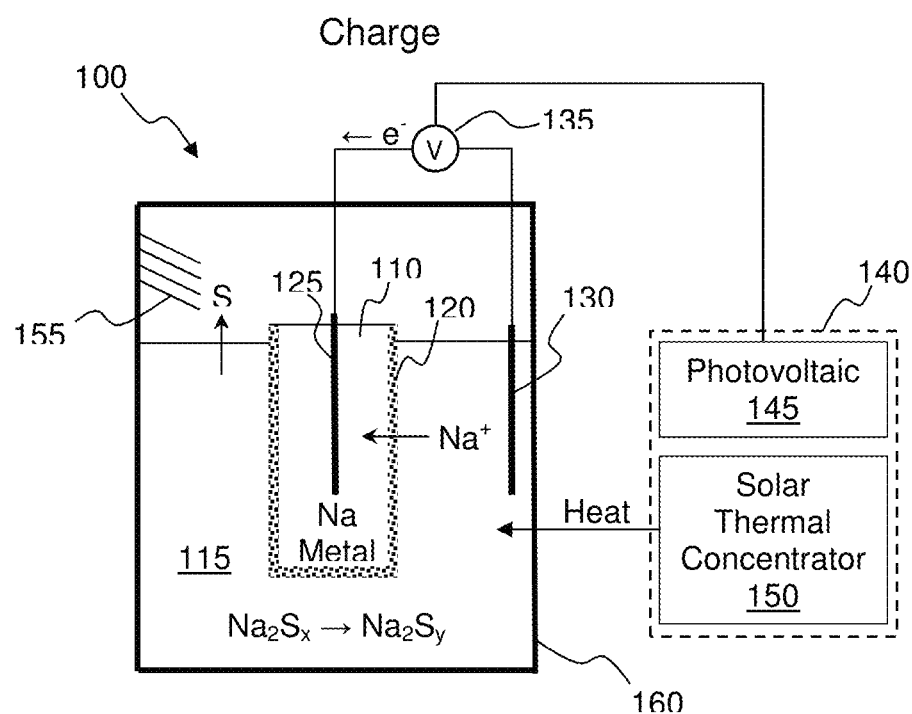
FIG. 2A is a schematic illustration of solar thermal/photovoltaic charging of a sodium-sulfur batter.
Figure 2B:
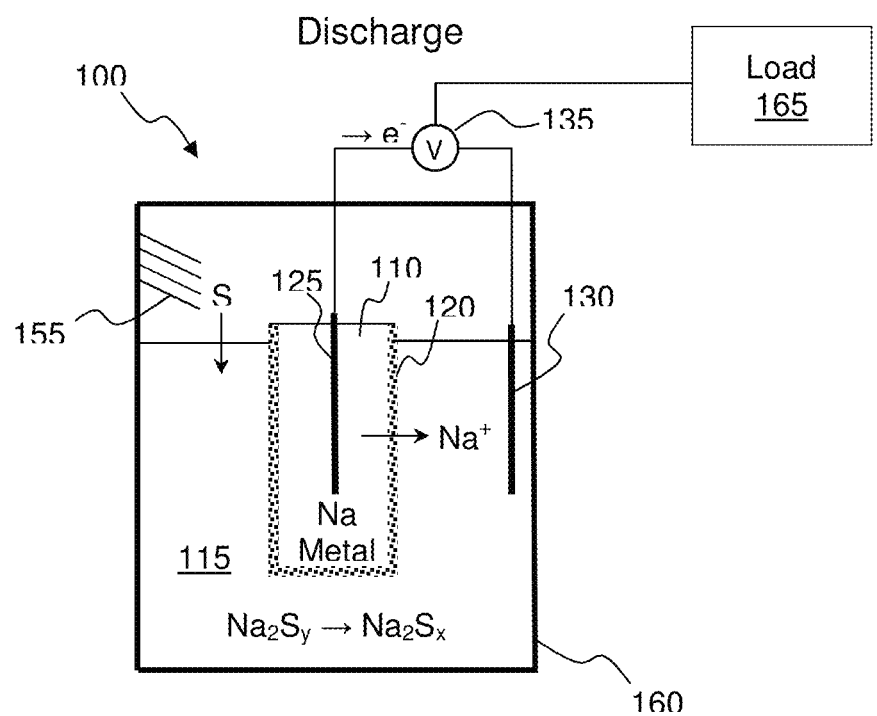
FIG. 2B is a schematic illustration of normal discharging of a sodium-sulfur battery.

FIGS. 2A and 2B show a schematic of the charge-discharge process in relation to a sodium-sulfur battery. The disclosed molten sodium battery or secondary cell 100 includes a sodium anode 110 that undergoes electrochemical oxidation during discharge and electrochemical reduction during charge. The molten sodium battery further includes a cathode 115 that undergoes electrochemical reduction during discharge and electrochemical oxidation during charge. The cathode comprises a catholyte composition that is thermally stable at cell operating conditions. The battery has a sodium ion conductive solid membrane 120 separating the cathode and catholyte composition from the sodium anode that selectively transports sodium ions and is chemically and thermally stable at cell operating conditions. Suitable current collectors 125, 130 provide electrical connection between the anode 110 and cathode 115 and a voltage source 135.

The battery includes a solar energy source 140. The solar energy source may include both a photovoltaic system 145 to provide an electric charging potential to voltage source 135 and a solar thermal concentrator 150 to provide heat to the battery and more specifically to the cathode and catholyte composition. The heat may be provided to the battery through any suitable mechanism, including but not limited to, a heat exchanger and direct heating via optical lenses and a heat transmitter window.

In the thermal charging mode, as described in connection with a sodium-sulfur battery, solar heat is used to heat the cathode and catholyte composition. The cathode and catholyte composition comprises one or more sodium polysulfides ($Na_2S_x$). The electrons for charging are supplied by the photovoltaic array 145. The $Na_2S_x$ is reduced to form higher polysulfides ($Na_2S_y$, where y>x) and ultimately sulfur. It is understood that as more sodium is removed during charging, y gets higher and higher, approaching y=20 and y=30, until sulfur is formed. At high temperature, sulfur is volatile and may be collected and condensed on the sulfur collection plates 155. A housing 160 seals to the cathode compartment to transmit heat from the solar thermal concentrator 150 and to prevent loss of the semi-volatile sodium polysulfide and volatile sulfur. While sulfur is generated, sodium ions will migrate through the sodium ion conductive solid membrane 120 and electrons will flow through the external circuit and sodium metal is produced. To recover the stored energy, the cell is discharged to power a load 165. Sodium is oxidized to form sodium ions and the sodium polysulfide ($Na_2S_x$) is generated.

Figure 3:
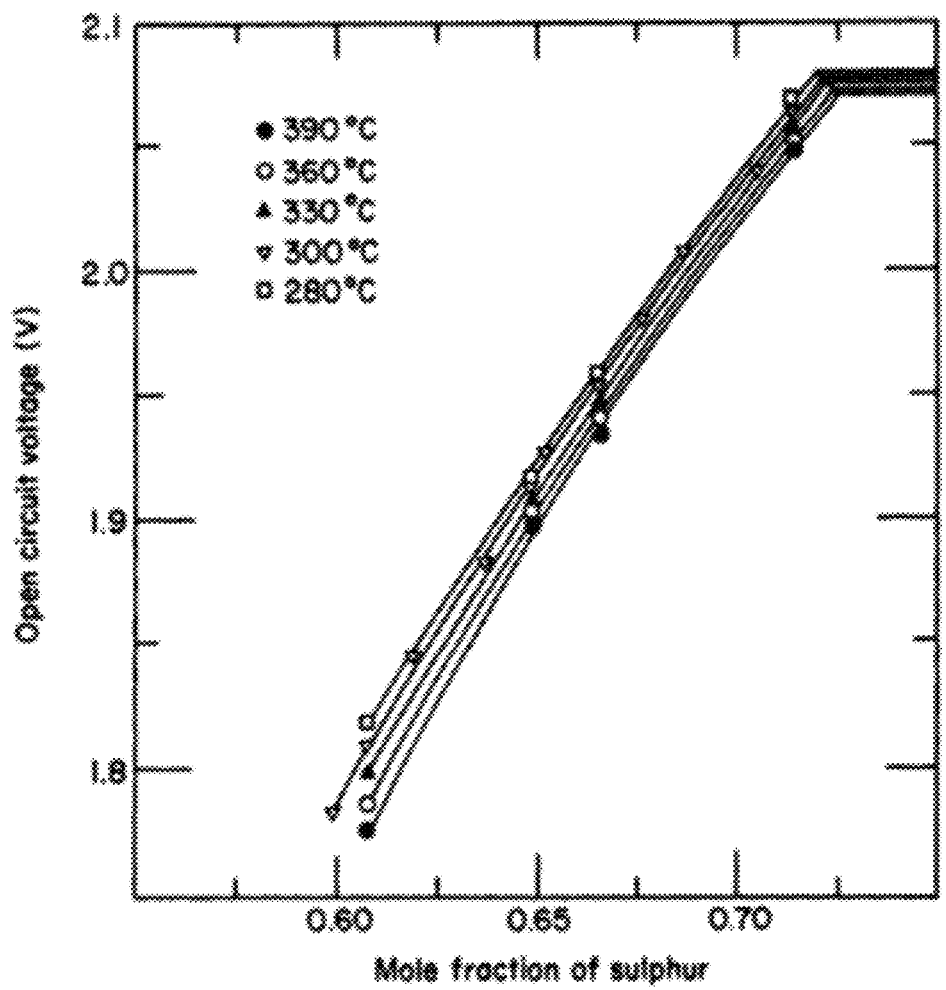
FIG. 3 is a graph of open circuit voltage (OCV) as a function of sulfur content, and temperature, for Na—S electrochemical cells.

In the proposed sodium-sulfur battery, the sodium anode and sulfur cathode are separated by a β"-alumina or NaSICON sodium-ion conducting solid electrolyte. The electrochemical reaction products formed during electrical charging (energetic chemicals) in the case of a traditional sodium-sulfur battery, in the present case are generated by a combination of thermal energy and electrical energy from a solar source. During charge, thermal input is used to heat the battery to high temperature between about 500 and 800° C. where the free energy of formation of sodium metal and higher sodium polysulfides is lower than at normal sodium-sulfur battery operation temperature (about 280 to 350° C.). FIG. 3 shows that the Open Circuit Voltage (OCV) decreases with increasing temperature. The OCV is also dependent on the mole fraction of sulfur in the Na—S compound according to FIG. 3. J. L. Sudworth and A. R. Tilley, The Sodium Sulfur Battery, p. 149, 1985.

The possible (theoretical) charge/discharge profile of a sodium-sulfur battery discharged at a normal operating temperature and charged at a higher temperature is illustrated in FIG. 1B. The low free energy of formation translates to lower charge voltage at higher temperatures, as shown in FIG. 1B. The dotted line in FIG. 1B indicates the OCV at normal operating temperature. After high temperature charge, metallic sodium and sulfur (or higher polysulfides) are collected in their respective anode and cathode compartments separated by the sodium ion conductive solid membrane. To recover the stored energy, the battery is discharged at lower temperature to produce lower sodium polysulfides in the cathode compartment. Because the charge voltage is lower than discharge voltage, the battery energy efficiency can potentially be greater than 100%.

While the foregoing discussion has focused on a sodium-sulfur battery, the invention includes other cathode systems compatible with a sodium anode and which may be charged at a higher temperature and lower voltage and discharged at lower temperature and higher voltage. Another non-limiting molten sodium secondary cell includes a sodium-halogen system that involves the oxidation of bromide or iodide to form bromine or iodine as the charge reaction. The cell may have the following electrochemical reactions as it operates:

| Anode | $Na \leftrightarrow Na^+ + 1e^-$ |
| Cathode | $2X^- + 2e^- \leftrightarrow X_2$ |
| Overall | $2Na + X_2 \leftrightarrow 2Na^+ + 2X^-$ |

Accordingly, where X comprises iodine, the cell may have the following chemical reactions and the following theoretical voltage (V) and theoretical specific energy (Wh/kg):

| Negative electrode | Na ↔ Na$^+$ + 1e$^-$ | (−2.71 V) |
| Positive electrode | 2I$^-$ + 2e$^-$ ↔ I$_2$ | (0.52 V) |
| Overall | 2Na + I$_2$ ↔ 2Na$^+$ + 2I$^-$ | (3.23 V) (581 Wh/kg) |

Additionally, where X comprises bromine, the cell may have the following chemical reactions and the following theoretical voltage and theoretical specific energy:

| Negative electrode | Na ↔ Na$^+$ + 1e$^-$ | (−2.71 V) |
| Positive electrode | 2Br$^-$ + 2e$^-$ ↔ Br$_2$ | (1.08 V) |
| Overall | 2Na + Br$_2$ ↔ 2Na$^+$ + 2Br$^-$ | (3.79 V) (987 Wh/kg) |

Where the cathode is a halogen and the catholyte composition comprises a sodium halide and a solvent. The solvent is selected from an organic solvent, an ionic liquid, and an inorganic molten-salt that are chemically and thermally stable at cell operating temperatures.

Non-limiting examples of the organic solvent include methylacetamide, dimethylacetamide, N-methyl formamide (NMF), formamide, dimethylformamide, tetraglyme, diglyme, dimethylether N-methyl formamide, dimethyl sulfoxide, and methyl sulfonyl chloride.

Non-limiting examples of the ionic liquid include quaternary-ammonium, phosphonium, imidazolium, or pyrrolidinium cations with halogenoaluminate, tetrafluroborate, halide, or bis(trifluoromethylsulfonyl)amide anions.

Non-limiting examples of the inorganic molten-salt include NaM$_x$(X1)$_y$(X2)$_z$, where X1 and X2 are halogens selected from Cl, Br or I; M can be Al, Cu, In, Ga, or any trivalent metal cation; $1 \leq x \leq 2$ is; $0 \leq y \leq 7$; and $0 \leq z \leq 7$. The sodium metal halogen compounds, of which sodium haloaluminate compounds are representative examples, can be either neutral, acidic, or basic. An "acidic melt" of NaX and AlX$_3$ has an AlX$_3$ mole ratio greater than 50%. A "neutral melt" of NaX and AlX$_3$ has an AlX$_3$ mole ratio equal to 50%. A "basic melt" of NaX and AlX$_3$ has an AlX$_3$ mole ratio less than 50%.

One advantage of using the inorganic molten-salt is the high sodium conductivity compared to organic solvents and ionic liquids. Furthermore, they may be safer to operate than organic-based catholyte solvents. In addition, the cells utilizing the inorganic molten-salts will be more energy dense due to higher molarity of the sodium halide.

Unlike the sodium-sulfur battery, the sodium-halogen system may be operated (discharged) at lower temperatures. Because of NaSICON's high sodium conductivity at lower temperatures, compared to sodium β"-alumina, NaSICON is a preferred sodium ion conductive solid membrane for use in sodium-halogen battery systems. The sodium-halogen battery having a NaSICON membrane may operate at a cell discharge temperature in the range from about 110 to 200° C. and a cell charge temperature in the range from about 300 to 400° C.

While the foregoing discussion has focused on a high temperature sodium battery, the invention includes other alkali metal anode systems, including lithium.

Non-limiting examples of the sodium ion conductive solid membrane include sodium beta alumina, sodium beta" alumina, and NaSICON. The NaSICON membrane commercially available from Ceramatec, Inc. is based on a sodium-metal-phosphate structure (Na$_{1+x}$Zr$_2$X$_y$(PO$_4$)$_3$) wherein x is between 0 and 3 and X is a dopant. Conductivity is near 5 milli-Siemens/centimeter (mS/cm) at 40° C. and rises to about 130 mS/cm at 200° C. If the anode material is lithium, then lithium conductive membranes may be utilized such as LISICON or glass ceramic. LiSICON is a class of lithium conductive ceramics which include: Li$_{2+2x}$Zn$_{1-x}$GeO$_4$ (−0.36<x<0.87), Li$_{14}$ZnGe$_4$O$_{16}$, and slight variations in stoichiometry and with amounts of cation substitution. As used herein, LiSICON also includes the lithium aluminum titanium phosphate family of compositions including, but not limited to, ceramic membranes having the formula Li$_{1+x}$Al$_x$Ti$_{2-x}$(PO$_4$)$_3$, where x is between 0.0 and 0.5; and Li(1+x+4y)Al$_x$Ti(1−x−y)(PO$_4$)$_3$ where x and y are between 0.0 and 0.5 and where slight substitutions of cations may be made to improve properties. The lithium-ion-conductive glass ceramic may include but are not limited to compositions in the lithium aluminosilicate glass ceramics and Li$_{1.5}$Al$_{0.5}$Ge$_{1.5}$ (PO$_4$)$_3$–xLi$_2$O (x=0.0-0.20). It is understood that partial substitutions of one or more of the elements with another element may improve a material characteristic but these variations are part of this invention.

While specific embodiments of the present invention have been illustrated and described, numerous modifications come to mind without significantly departing from the spirit of the invention, and the scope of protection is only limited by the scope of the accompanying claims.

The invention claimed is:

1. A molten sodium secondary cell that charges at a high temperature and discharges at a relatively lower temperature, comprising:
   a sodium anode that undergoes electrochemical oxidation during discharge and electrochemical reduction during charge;
   a cathode that undergoes electrochemical reduction during discharge and electrochemical oxidation during charge, wherein the cathode comprises a catholyte composition that is thermally stable at cell operating conditions;
   a sodium ion conductive solid membrane separating the cathode and catholyte composition from the sodium anode that selectively transports sodium ions and is chemically and thermally stable at cell operating conditions; and
   a solar energy source comprising:
      a photovoltaic system to provide an electric charging potential to the sodium anode and the cathode; and
      a solar thermal concentrator to provide heat to the cathode and catholyte composition to cause the molten sodium secondary cell to charge at a temperature in the range from about 300 to 800° C.;
   wherein the cell has a charge temperature and a charge voltage and a discharge temperature and a discharge voltage, wherein the charge temperature is substantially higher than the discharge temperature and the charge voltage is lower than the discharge voltage.

2. The molten sodium secondary cell according to claim 1, wherein the catholyte composition comprises one or more sodium sulfide compounds.

3. The molten sodium secondary cell according to claim 1, wherein the catholyte composition comprises a sodium halide and a solvent.

4. The molten sodium secondary cell according to claim 3, wherein the solvent is selected from an organic solvent, an ionic liquid, and an inorganic molten-salt.

5. The molten sodium secondary cell according to claim 4, wherein the organic solvent is selected from methylacetamide, dimethylacetamide, N-methyl formamide (NMF), formamide, dimethylformamide, tetraglyme, diglyme, dimethylether N-methyl formamide, dimethyl sulfoxide, and methyl sulfonyl chloride.

6. The molten sodium secondary cell according to claim 4, wherein the ionic liquid is selected from quaternary-ammonium, phosphonium, imidazolium, or pyrrolidinium cations with halogenoaluminate, tetrafluroborate, halide, or bis(trifluoromethylsulfonyl)amide anions.

7. The molten sodium secondary cell according to claim 4, wherein the inorganic molten-salt is selected from $NaM_x(X1)_y(X2)_z$, where X1 and X2 are halogens selected from Cl, Br or I; M is selected from Al, Cu, In, Ga or any trivalent metal cation; $1 \leq x \leq 2$; $0 \leq y \leq 7$; and $0 \leq z \leq 7$.

8. The molten sodium secondary cell according to claim 1, wherein the cell discharges at a temperature in the range from about 110 to 350° C.

9. The molten sodium secondary cell according claim 1, wherein the electrochemical reaction products formed during cell charge have a free energy of formation that is lower at the charge temperature than the discharge temperature.

10. The molten sodium secondary cell according to claim 1, wherein the sodium ion conductive solid membrane comprises a sodium β"-alumina ceramic electrolyte.

11. The molten sodium secondary cell according to claim 10, wherein the cell discharges at a temperature in the range from about 280 to 350° C.

12. The molten sodium secondary cell according to claim 10, wherein the cell charges at a temperature in the range from about 500 to 800° C.

13. The molten sodium secondary cell according to claim 1, wherein the sodium ion conductive solid membrane comprises a NaSICON ceramic electrolyte.

14. The molten sodium secondary cell according to claim 13, wherein the cell discharges at a temperature in the range from about 110 to 200° C.

15. The molten sodium secondary cell according to claim 13, wherein the cell charges at a temperature in the range from about 300 to 400° C.

16. A method of operating a molten sodium secondary cell comprising:
  obtaining a hybrid sodium anode battery comprising:
    a sodium anode that undergoes electrochemical oxidation during discharge and electrochemical reduction during charge;
    a cathode in contact with a catholyte composition that undergoes electrochemical reduction during discharge and electrochemical oxidation during charge, wherein the cathode and catholyte composition are thermally stable at cell operating conditions;
    a sodium ion conductive solid membrane separating the catholyte from the sodium anode that selectively transports sodium ions and is chemically and thermally stable at cell operating conditions; and
  a solar energy source comprising:
    a photovoltaic system to provide an electric charging potential to the sodium anode and the cathode; and
    a solar thermal concentrator to provide heat to the cathode and catholyte solution during charging;
  charging the molten sodium secondary cell at a charge temperature and a charge voltage; and
  discharging the molten sodium secondary cell at a discharge temperature and a discharge voltage, wherein the charge temperature is substantially higher than the discharge temperature and the charge voltage is lower than the discharge voltage.

17. The method according to claim 16, wherein the catholyte composition comprises one or more sodium sulfide compounds.

18. The method according to claim 16, wherein the catholyte composition comprises a sodium halide and a solvent.

19. The method according to claim 16, wherein the charge temperature is in the range from about 300 to 800° C.

20. The method according to claim 16, wherein the discharge temperature is in the range from about 110 to 350° C.

21. The method according to claim 16, wherein the electrochemical products formed during cell charge have a free energy of formation that is lower at the charge temperature than the discharge temperature.

22. The method according to claim 16, wherein the sodium ion conductive solid membrane comprises a sodium β"-alumina ceramic electrolyte.

23. The method according to claim 22, wherein the discharge temperature is in the range from about 280 to 350° C.

24. The method according to claim 22, wherein the charge temperature is in the range from about 500 to 800° C.

25. The method according to claim 16, wherein the sodium ion conductive solid membrane comprises a NaSICON ceramic electrolyte.

26. The method according to claim 25, wherein the discharge temperature is in the range from about 110 to 200° C.

27. The method according to claim 25, wherein the charge temperature is in the range from about 300 to 400° C.

* * * * *